United States Patent
Rakshit et al.

(10) Patent No.: US 10,922,660 B2
(45) Date of Patent: Feb. 16, 2021

(54) INTELLIGENT SENDING OF AN AUTOMATIC EVENT INVITE BASED ON IDENTIFIED CANDIDATE CONTENT

(71) Applicant: INTERNATIONAL BUSINESS MACHINES CORPORATION, Armonk, NY (US)

(72) Inventors: Sarbajit K. Rakshit, Kolkata (IN); John D. Wilson, League City, TX (US); David B. Lection, Raleigh, NC (US); Mark B. Stevens, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 148 days.

(21) Appl. No.: 16/054,743

(22) Filed: Aug. 3, 2018

(65) Prior Publication Data
US 2020/0042947 A1   Feb. 6, 2020

(51) Int. Cl.
*G06Q 10/10* (2012.01)
*G06Q 10/04* (2012.01)
*G06Q 10/02* (2012.01)

(52) U.S. Cl.
CPC ......... *G06Q 10/1093* (2013.01); *G06Q 10/02* (2013.01); *G06Q 10/04* (2013.01)

(58) Field of Classification Search
CPC ......... G06Q 10/1095; G06Q 10/06314; G06Q 10/06311; G06Q 10/1093; G06Q 10/109
See application file for complete search history.

(56) References Cited

U.S. PATENT DOCUMENTS

| | | | |
|---|---|---|---|
| 6,101,480 A | 8/2000 | Conmy et al. | |
| 7,027,995 B2 | 4/2006 | Kaufman et al. | |
| 7,679,518 B1* | 3/2010 | Pabla | G06Q 10/109 |
| | | | 340/309.16 |
| 8,270,320 B2 | 9/2012 | Boyer et al. | |
| 8,489,615 B2 | 7/2013 | Dhara et al. | |
| 9,703,772 B2* | 7/2017 | Clarke | G06F 3/016 |
| 9,978,043 B2* | 5/2018 | Jon | G06F 3/0482 |
| 10,263,799 B1* | 4/2019 | Jouhikainen | G06Q 10/00 |
| 10,339,494 B2* | 7/2019 | Bostick | G06Q 10/087 |
| 10,560,662 B1* | 2/2020 | Tippana | H04N 7/15 |
| 10,614,426 B2* | 4/2020 | Bellary | G06F 40/30 |
| 2004/0243422 A1* | 12/2004 | Weber | G06Q 10/06312 |
| | | | 705/7.22 |

(Continued)

OTHER PUBLICATIONS

Horvitz et al., "Coordinate: Probabilistic Forecasting of Presence and Availability," UAI'02 Proceedings of the Eighteenth Conference on Uncertainty in Artificial Intelligence, Aug. 1-4, 2002 (10 pages).

(Continued)

*Primary Examiner* — Scot L Jarrett
(74) *Attorney, Agent, or Firm* — Griffiths & Seaton PLLC (57) ABSTRACT

Embodiments for intelligent sending of an automatic event invite based on identified candidate content by a processor. Data from one or more data sources may be cognitively analyzed to identify data content having a possible impact to one or more entities. An automatic event invite for an event may be sent to one or more participants to provide one or more actions relating to the possible impact to the one or more entities.

12 Claims, 7 Drawing Sheets

(56) References Cited

U.S. PATENT DOCUMENTS

| | | | | |
|---|---|---|---|---|
| 2005/0022207 | A1* | 1/2005 | Grabarnik | G06F 8/427 719/313 |
| 2006/0031326 | A1* | 2/2006 | Ovenden | G06Q 10/109 709/206 |
| 2006/0206446 | A1* | 9/2006 | Cowell | G06Q 10/107 |
| 2007/0073810 | A1* | 3/2007 | Adams | H04M 1/72552 709/205 |
| 2008/0133282 | A1 | 6/2008 | Landar et al. | |
| 2008/0147469 | A1 | 6/2008 | Murillo et al. | |
| 2010/0049808 | A1* | 2/2010 | Rosenberg | G06Q 10/10 709/206 |
| 2011/0022967 | A1 | 1/2011 | Vijayakumar et al. | |
| 2011/0106573 | A1* | 5/2011 | McNamara | G06Q 10/1095 705/5 |
| 2011/0106892 | A1* | 5/2011 | Nelson | G06Q 10/109 709/206 |
| 2011/0228922 | A1* | 9/2011 | Dhara | H04M 3/565 379/202.01 |
| 2012/0005728 | A1* | 1/2012 | Farrell | G06Q 10/00 726/4 |
| 2012/0185259 | A1* | 7/2012 | Roitman | G06Q 10/109 705/1.1 |
| 2012/0243670 | A1* | 9/2012 | Horesh | H04L 51/02 379/88.16 |
| 2013/0060592 | A1* | 3/2013 | Motoyama | G06Q 10/1095 705/7.19 |
| 2014/0187213 | A1* | 7/2014 | Shuster | G06Q 10/1093 455/414.1 |
| 2014/0188541 | A1* | 7/2014 | Goldsmith | H04L 67/306 705/7.19 |
| 2015/0006218 | A1 | 1/2015 | Klemm et al. | |
| 2016/0180259 | A1* | 6/2016 | Marianko | H04L 65/1069 705/5 |
| 2016/0371655 | A1* | 12/2016 | Cheng | G06Q 50/01 |
| 2017/0083872 | A1* | 3/2017 | Blomberg | H04M 3/56 |
| 2017/0091715 | A1* | 3/2017 | Abou Mahmoud | G06Q 10/1095 |
| 2017/0126755 | A1* | 5/2017 | Singh | H04L 63/0442 |
| 2017/0178080 | A1* | 6/2017 | Abebe | G06F 16/383 |
| 2017/0201471 | A1* | 7/2017 | Miklos | G06Q 10/00 |
| 2018/0107988 | A1* | 4/2018 | Codella | G06Q 10/1095 |
| 2018/0158030 | A1* | 6/2018 | Hakami | G06F 21/60 |
| 2018/0181719 | A1* | 6/2018 | Balian | G16H 40/20 |
| 2018/0204147 | A1* | 7/2018 | Koitz | H04L 12/282 |
| 2018/0218335 | A1* | 8/2018 | Jenkins | G06Q 10/1095 |
| 2018/0260790 | A1* | 9/2018 | Connolly | G06Q 10/1095 |
| 2018/0260825 | A1* | 9/2018 | Rashid | G06Q 30/0201 |
| 2018/0293550 | A1* | 10/2018 | Liang | G06Q 10/1095 |
| 2018/0336531 | A1* | 11/2018 | Avalos Vega | G06Q 10/1095 |
| 2018/0341928 | A1* | 11/2018 | Khan | G06Q 10/1097 |
| 2019/0172017 | A1* | 6/2019 | Burlin | G06Q 10/1093 |
| 2019/0173966 | A1* | 6/2019 | Grokop | H04L 67/36 |
| 2019/0180248 | A1* | 6/2019 | Byun | G06Q 10/1095 |
| 2019/0236555 | A1* | 8/2019 | Bennett | G06F 16/24578 |
| 2019/0279164 | A1* | 9/2019 | Byron | G06F 16/2457 |
| 2019/0303878 | A1* | 10/2019 | Megahed | G06Q 10/1095 |
| 2019/0385095 | A1* | 12/2019 | Callmer | H04L 67/18 |
| 2020/0005248 | A1* | 1/2020 | Gerzi | G06Q 10/1095 |

OTHER PUBLICATIONS

Li et al., "Using Meeting Topic Tags to Automatically Invite Attendees to Online Meetings," An IP.com Prior Art Database Technical Disclosure, IP.com No. IPCOM000226020D, Mar. 20, 2013 (5 pages).

\* cited by examiner

INTELLIGENT SENDING OF AN AUTOMATIC EVENT INVITE BASED ON IDENTIFIED CANDIDATE CONTENT

BACKGROUND OF THE INVENTION

Field of the Invention

The present invention relates in general to computing systems, and more particularly, to various embodiments for providing intelligent sending of an automatic event invite based on identified candidate content by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. Smartphones and other sophisticated devices that rest in the palm of a person's hand allow for the sharing of information between users in an increasingly user friendly and simple manner. The increasing complexity of society, coupled with the evolution of technology, continue to engender the sharing of a vast amount of information between consumers, businesspersons, educators, and others.

SUMMARY OF THE INVENTION

Various embodiments for intelligent sending of an automatic event invite based on identified candidate content by a processor are provided. In one embodiment, by way of example only, a method for intelligent sending of an automatic event invite based on identified candidate content within a cloud computing environment, again by a processor, is provided. Data from one or more data sources may be cognitively analyzed to identify data content having a possible impact to one or more entities. An automatic event invite for an event may be sent to one or more participants to provide one or more actions relating to the possible impact to the one or more entities.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

In today's environment, many entities (e.g., persons, organizations, business, government agencies, academic institutions) often send various meeting invites on ad-hoc or planned basis. It is critical for these entities to know the identity of appropriate participants of any meeting. Many times, however, one or more key participants are not included in receiving the meeting invite. Also, it is extremely challenging and difficult for these entities to determine the availability of the participants and finding available time. The type and number of participants also becomes critical for the meeting given the various types of meetings such as, for example, training meetings, group-discussion meetings, status meetings, etc. For each meeting, type there can be various types of participants with different roles. For example, during a training meeting, a trainer and students are required for attendance. As an additional example, scheduling meeting may be even more complex requiring consideration of various parameters such as, for example, availability of a meeting room, availability of other resources, participants, a knowledge level, or prior information of the participants, etc. For example, if a customer sent a complaint email against a late, delivered product, the participants receiving the email should be those participants that know details relating to the product and when was delivered. At the same time, the participants may not be co-located thus a conference call may be required.

Accordingly, the present invention provides for intelligent sending of an automatic event invite based on identified candidate content by a processor are provided. In one embodiment, by way of example only, a method for intelligent sending of an automatic event invite based on identified candidate content within a cloud computing environment, again by a processor, is provided. Data from one or more data sources may be cognitively analyzed to identify data content having a possible impact to one or more entities. An automatic event invite for an event may be sent to one or more participants to provide one or more actions relating to the possible impact to the one or more entities.

In an additional aspect, the present invention provides a cognitive inference engine that may cognitively analyze various data contents (e.g. data from email, social media/ networks, public domain, etc.) to identify candidate data content relating to an event (e.g., meeting) having a direct or indirect impact to an entity and/or group of entities. One or more participants may be cognitively identified that mitigates and/or plans one or more actions on the identified candidate data content. The one or more participants may be clustered (e.g., clustered into one or more groups using K-means technique) according to calendar schedule availability, a degree of interest in a topic of the data content, a knowledge level, a priority level (e.g., customer escalation), a type of the event (e.g., meeting), or a combination thereof. It should be noted that the K-means clustering aims to partition n observations into k clusters in which each observation belongs to the cluster with the nearest mean, serving as a prototype of the cluster. That is, the K-means is used for partitioning a data set into K distinct, non-overlapping clusters. For example, K-Means works by defining a set of starting cluster centers derived from data. It then assigns each record to the cluster to which it is most similar, based on the record's input field values. After all cases have been assigned, the cluster centers are updated to reflect the new set of records assigned to each cluster. The records are then checked again to see whether they should be reassigned to a different cluster, and the record assignment/cluster iteration process continues until either the maximum number of iterations is reached, or the change between one iteration and the next fails to exceed a specified threshold.

One or more resources and/or logistics may be automatically arranged (e.g., scheduled, reserved, provided, etc.) for the event according to a number of the one or more participants, location of the one or more participants, a type of event, availability of the one or more resources, a priority of the event, or a combination thereof. A calendar meeting invite having a customized agenda topic, venue information relating to the event may be automatically sent to the one or more participants.

In one aspect, the cognitive inference engine is a machine learning component that=may be initialized to adjust one or more event parameters, reschedule the event, forecast one or more future events, and learn scheduling conflicts, a level of interest of a topic or the event, one or more parameters relating to the event. The cognitive inference engine may collect feedback information from the one or more participants relating to the event and acceptance or rejection of the automatic event invite.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor-based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
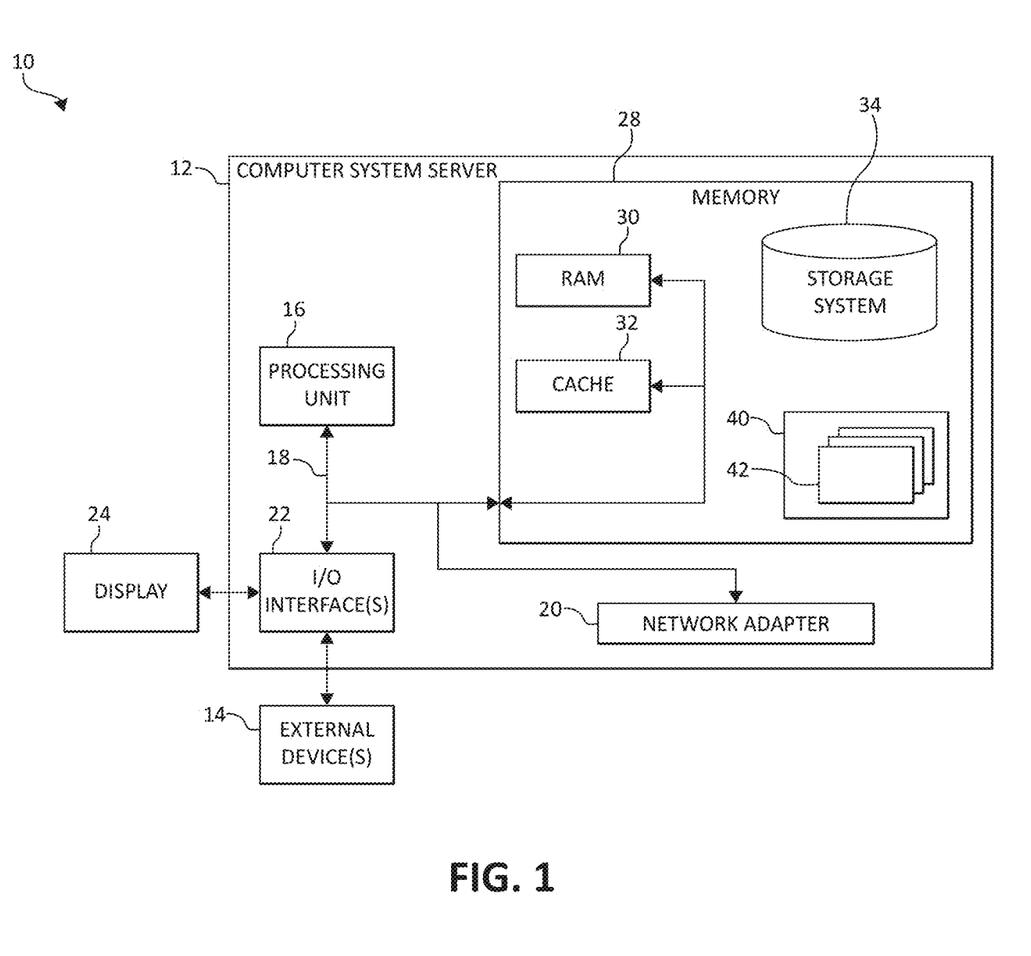
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
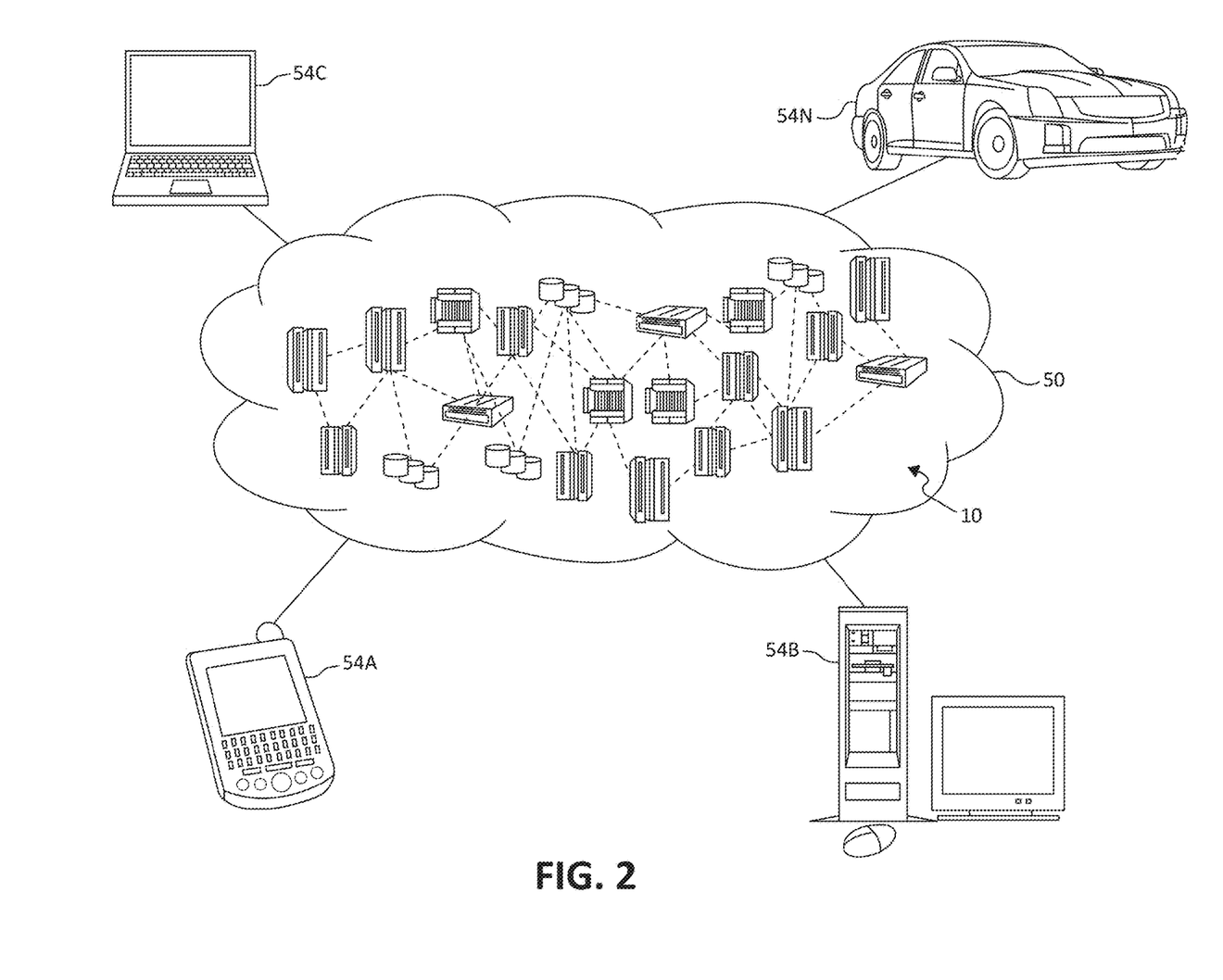
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
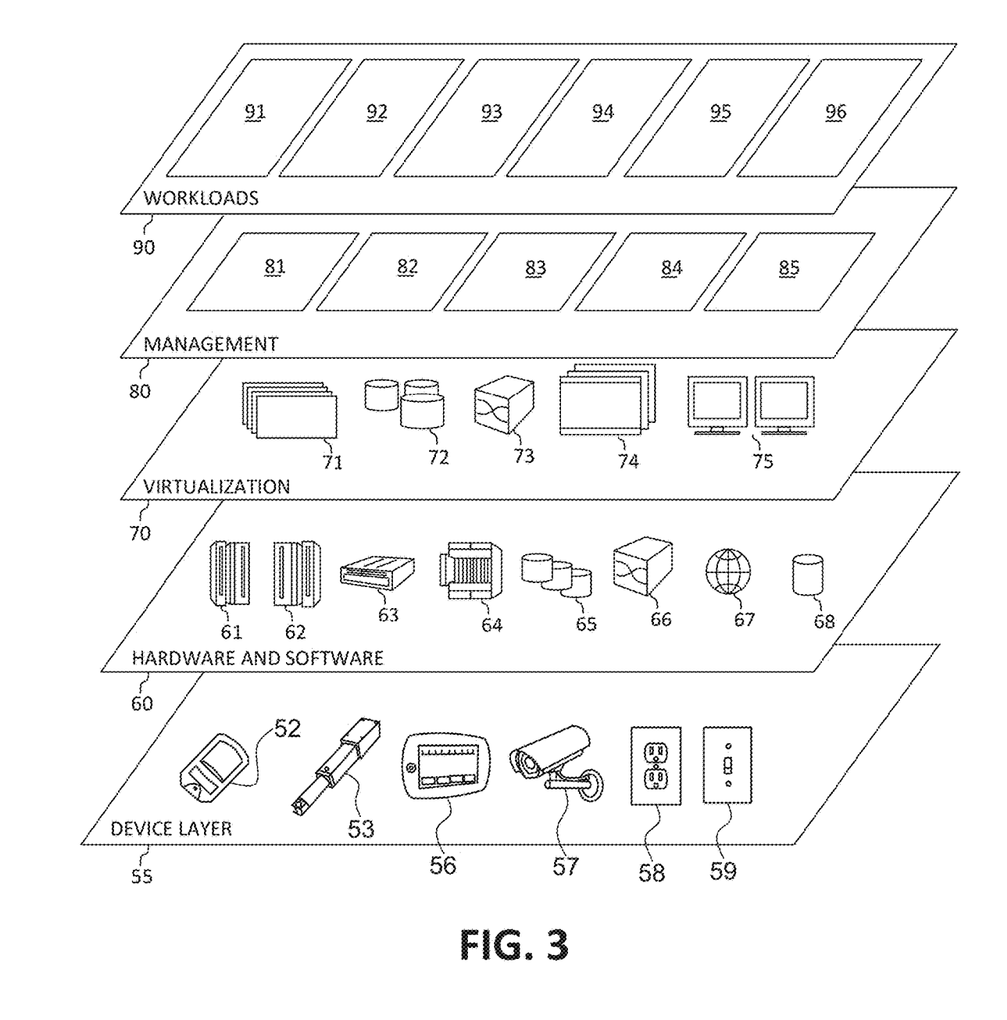
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent sending of an automatic event invite based on identified candidate content. In addition, workloads and functions 96 for intelligent sending of an automatic event invite based on identified candidate content may include such operations as data analytics, data analysis, and as will be further described, notification functionality. One of ordinary skill in the art will appreciate that the workloads and functions 96 for intelligent sending of an automatic event invite based on identified candidate content may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously indicated, the present invention provides for intelligent sending of an automatic event invite based on identified candidate content using a cognitive inference engine. For example, consider the following. If a user and a subordinate receive an email from a customer with topic of "The product you have delivered is not in good shape" the cognitive inference engine may read and analyze the contents of the email. The cognitive inference engine may automatically schedule a meeting where one or more participants may be invited apart from the user and the subordinate. That is, the cognitive inference engine may identify those persons associated with the topic such as, for example, employees associated with the product and have a knowledge of why the product quality is bad or damaged (e.g., "not in good shape). The cognitive inference engine may identify who will be the presenters, who will be the event chair, and other defined parameters.

As an additional example, assume a government entity has increased electricity price and the price increase action has been published in newspaper. In one aspect, the cognitive inference engine may automatically set a meeting invite for one or more committee members and/or any other knowledgeable person of any housing complex to identify how power consumption can be optimized. The cognitive inference engine may identify candidate topics and will automatically schedule a meeting invite. In one aspect, the candidate topic may be, but not limited to news data, email communication such as, for example, an email from a customer, and/or social network data that may include a discussion of the content, which may have a predicted impact on business, personal life, etc.

Figure 4A:
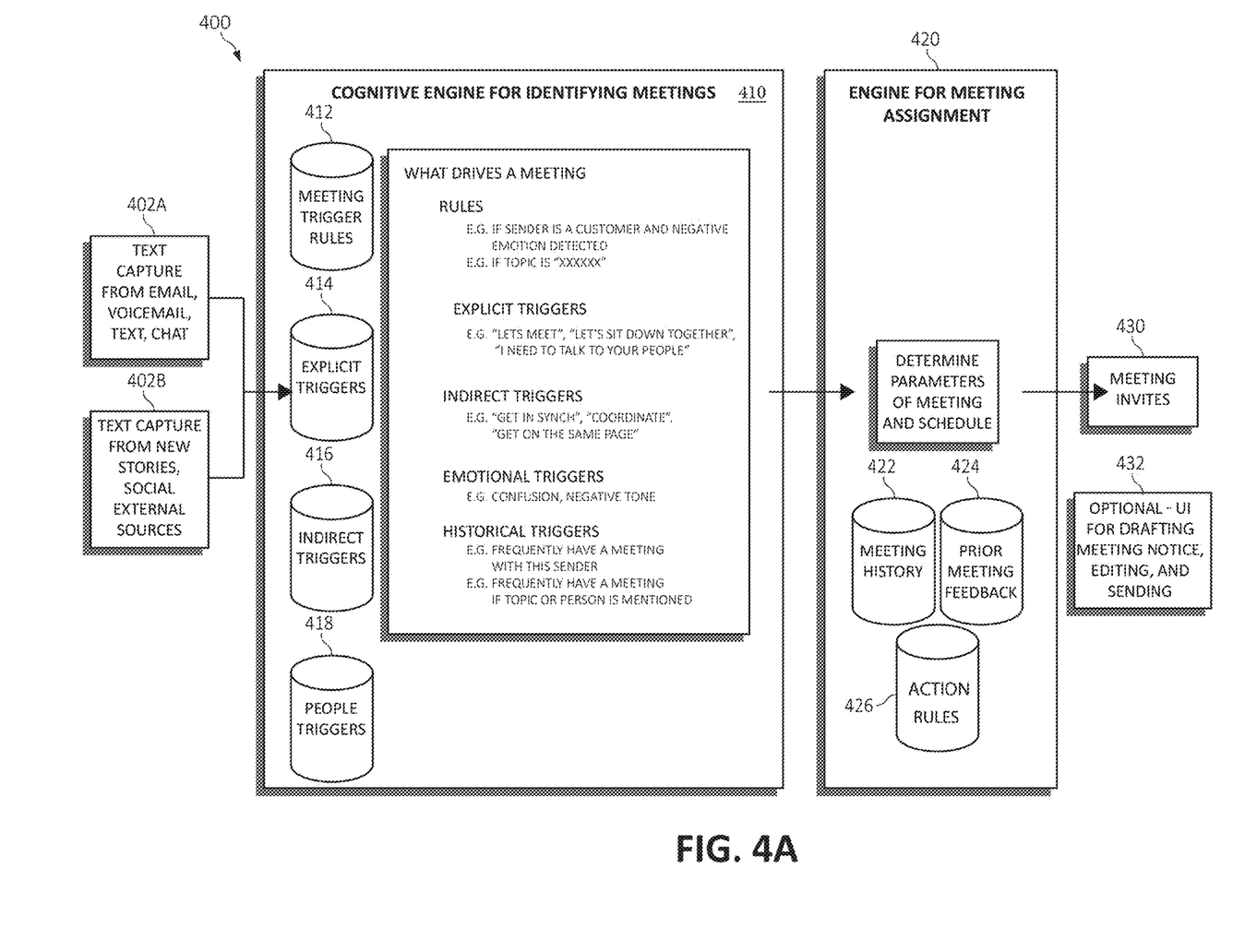
FIG. 4A-4B are block diagrams depicting various user hardware and cloud computing components for intelligent sending of an automatic event invite based on identified candidate content in accordance with aspects of the present invention.
Figure 4B:
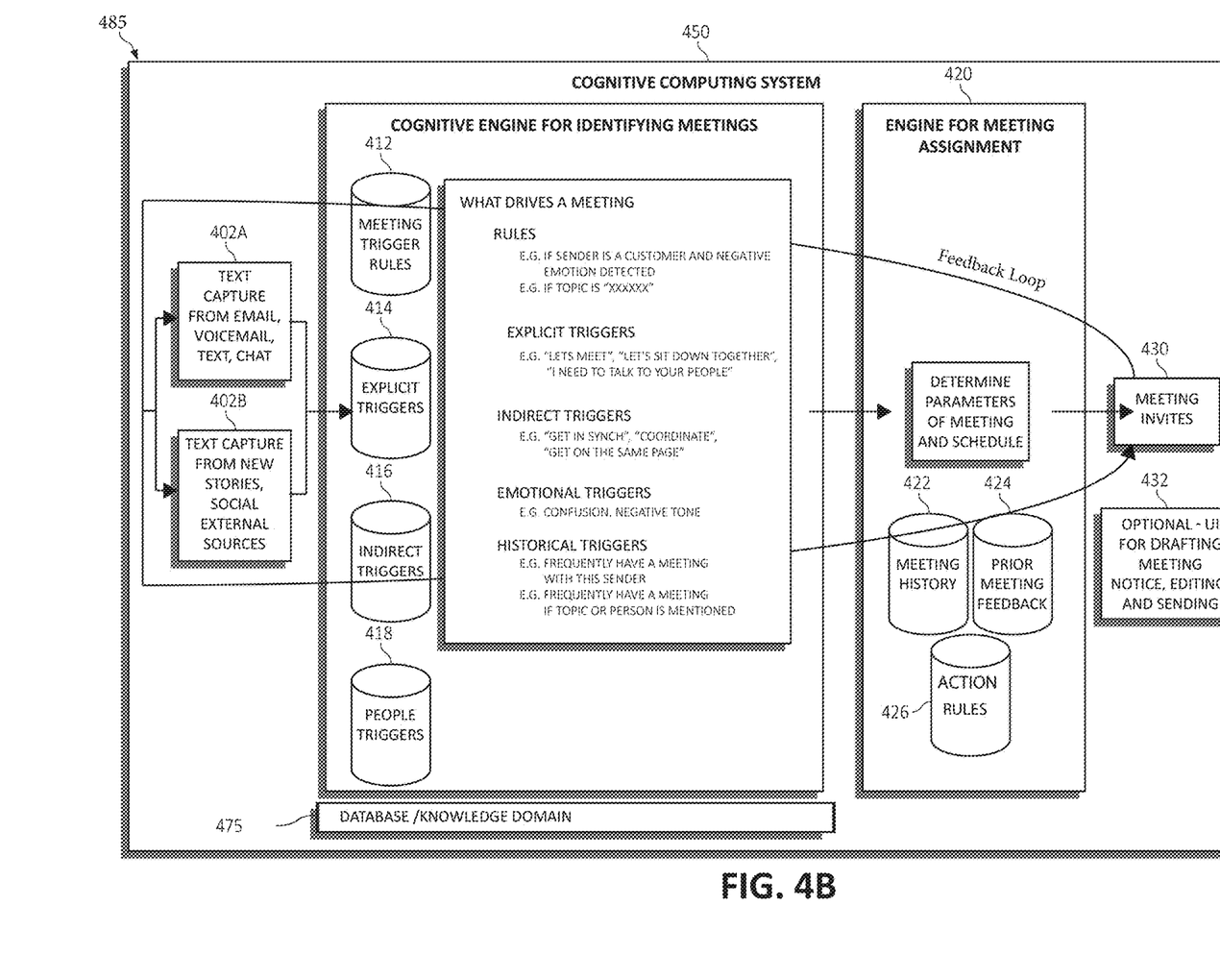

Turning now to FIGS. 4A-4B, block diagrams depicting exemplary functional components of computing environment 400 and 485 according to various mechanisms of the illustrated embodiments are shown. FIG. 4A-4B illustrates intelligent sending of an automatic event invite based on identified candidate content workloads and functions and training of a machine learning model in a computing environment, such as a computing environment 400, according to an example of the present technology. As will be seen, many of the functional blocks may also be considered "modules" or "components" of functionality, in the same descriptive sense as has been previously described in FIGS. 1-3. With the foregoing in mind, the module/component blocks of computing environment 400 and 485 may also be incorporated into various hardware and software components of a system for intelligent sending of an automatic event invite based on identified candidate content in accordance with the present invention. Many of the functional blocks of computing environment 400 and 485 may execute as background processes on various components, either in distributed computing components, or on the user device, or elsewhere. In one aspect, the computer system/server 12 having processing unit 16 and memory 28 may be implemented in FIGS. 4A-4B to perform various computational, data processing and other functionality in accordance with various aspects of the present invention.

The computing environment 400 may include a cognitive engine 410 for identifying one or more events (e.g., identifying meetings) and/or a cognitive engine 420 for assigning/scheduling one or more events (e.g., meeting assignment). In one aspect, the cognitive engine 410 and the cognitive engine 420 may be combined collectively to form a cognitive inference engine. In an additional example, the cognitive engine 410 and the cognitive engine 420 may each be a cognitive inference engine. The cognitive engine 410 may include one or more rules 412 (e.g., meeting trigger rules), one or more triggers 414 (e.g., explicit triggers), one or more indirect triggers 416, and/or one or more entity (e.g., people) triggers 418. The cognitive engine 420 may determine one or more parameters of an event and/or schedule. The cognitive engine 420 may include historical data 422 (e.g., event/meeting history), feedback component 424 (e.g., prior meeting feedback), one or more action rules 426.

In operation, the cognitive engine 410 may receiving data 402A or 402B from one or more various data sources. For example, data 402A may include data such as, for example, text data captured from email, a voicemail communication message, text message, and/or chat messages. Data 402B may include data such as, for example, text data captured from news articles, social media/networks, one or more external sources.

Thus, data 402A and/or 402B may include, but are not limited to, data/data sources relating to one or more documents, materials related to emails, books, scientific papers, online journals, journals, articles, drafts, audio data, video data, and/or other various documents or data sources capable of being published, displayed, interpreted, transcribed, or reduced to text data. The data 402A and/or 402B may be all of the same type, for example, pages or articles in a wiki or pages of a blog. Alternatively, the data 402A and/or 402B may be of different types, such as word documents, wikis, web pages, power points, printable document format, or any document capable of being analyzed by a natural language processing system.

In addition to text-based documents, other data sources such as audio, video or image sources may also be used wherein the audio, video or image sources may be pre-analyzed to extract or transcribe their content for natural language processing, such as converting from audio to text and/or image analysis. As an additional example, the data 402A and/or 402B (e.g., documents, emails, reports, notes, audio records, video recordings, live-streaming communications) may be data from a video such as, for example, a webinar or meeting where cameras are installed in a room for broadcasting the meeting to remote locations. The video data captured by a camera may be analyzed and transcribed into images or text data for natural language processing and included as the data 402A and/or 402B. The group of data 402A and/or 402B may be consumed and reduced to text data using natural language processing (NLP) and artificial intelligence (AI) to provide processed content. Cognition is the mental process of knowing, including aspects such as awareness, perception, reasoning and judgment. An AI system uses artificial reasoning to interpret the data 402A and/or 402B and extract their topics, ideas, or concepts.

Using the data 402A and/or 402B, the cognitive engine 410 may cognitively analyzing the data 402A and/or 402B to identify data content having a possible impact to one or more entities (e.g., learning a query of "what drives a meeting"). That is, the cognitive engine 410 may determine and identify a type of meeting that may be required so as to generate and automatically send an event invite for an event (e.g., meeting) to one or more participants to provide one or more actions relating to the possible impact to the one or more entities.

For example, the cognitive engine 410 may use the one or more rules 412 (e.g., meeting trigger rules) to determine if a sender of a communication (e.g., email) is an identified user (e.g., a customer) and may detect an emotion of the sender in the communication (e.g., detect a negative emotion). The one or more rules 412 may be also be used to identity a topic (e.g., topic is "xoxoxox") of the communication.

The cognitive engine 410 may use the one or more triggers 414 (e.g., explicit triggers) to determine any explicit action (e.g., direct action for a meeting) that is required, request, mandated, or expected from the communication (e.g., "let's meet," "let's sit down together, "I need to talk to your people.")

The cognitive engine 410 may use the one or more indirect triggers 416 to determine any indirect action (e.g., indirect action for a meeting) that is implied, hinted, suggest, or desired from the communication (e.g., "get in synch," "coordinate," "get on same page.")

The cognitive engine 410 may use the one or more entity (e.g., people) triggers 418, used in conjunction with the may be used to determine emotional triggers (e.g., confusion, negative tone, frustration, positive tone, etc.) and/or historical triggers (e.g., frequently have a meeting with the sender, frequently have a meeting if a topic or person is mentioned.)

Using the cognitively analyzed and identified meeting data from cognitive engine 410, the cognitive engine 420 (e.g., engine for meeting assignment) may determine one or more parameters for a meeting and schedule. That is, the cognitive engine 420 may use data relating to meeting history 422, prior meeting feedback 424, and/or one or more action rules 426 for determining the one or more parameters for a meeting and schedule. The cognitive engine 420 may then automatically send an event invite (e.g., automatic meeting invite) for an event (e.g., meeting) to one or more identified participants to provide one or more actions relating to the possible impact (direct or indirect) to the one or more entities.

In one aspect, a user interface ("UP") 432 (e.g., an interactive graphical user interface "GUI") providing user interaction with one or more users for preparing/drafting the event invite notice, editing the event invite, and/or sending the event invite.

As more clearly illustrated in FIG. 4B, the computing environment 400 may also include a cognitive computing system 450 such as, for example, in a cloud computing environment. In addition to each of the components and/or modules described in FIG. 4A, cognitive computing system 450 may include a database 475 (e.g., knowledge domain or "data ocean") that may collect, capture, store, maintain, use, or retrieve data relating to each of the actions, descriptions, or operations described in FIG. 4A.

The database 475 may include the knowledge domain, which may be an ontology of concepts representing a domain of knowledge. A thesaurus or ontology may be used as the database 475 and may also be used to identify semantic relationships between observed and/or unobserved variables by the cognitive component 410. In one aspect, the term "domain" is a term intended to have its ordinary meaning. In addition, the term "domain" may include an area of expertise for a system or a collection of material, information, content and/or other resources related to a particular subject or subjects. A domain can refer to information related to any particular subject matter or a combination of selected subjects.

The term ontology is also a term intended to have its ordinary meaning. In one aspect, the term ontology in its broadest sense may include anything that can be modeled as an ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

Additionally, the domain knowledge may include one or more external resources such as, for example, links to one or more Internet domains, webpages, and the like. For example, text data may be hyperlinked to a webpage that may describe, explain, or provide additional information relating to the text data. Thus, a summary may be enhanced via links to external resources that further explain, instruct, illustrate, provide context, and/or additional information to support a decision, alternative suggestion, alternative choice, and/or criteria.

Thus, the cognitive component 410 and/or the cognitive component 420 may use the database 475, which may track, identify, and associate all communication threads, messages, transcripts, images, mappings, geographical records and data, structural data (e.g., buildings, landmark, etc.), archive data, books, scientific papers, online journals, journals, articles, drafts, materials related to emails, audio data, images or photographs, video data, and/or other various documents of all data generated during all stages of the development or "life cycle" of the decisions, decision elements, alternatives, choices, criteria, subjects, topics, or ideas of the operations described in FIG. 4A.

In one aspect, a feedback component 424 (using a feedback loop) may be used in conjunction with the cognitive component 410 and/or the cognitive component 420. Thus, the cognitive component 410 and/or the cognitive component 420 may perform one or more machine learning operation and learn information based on feedback from invitees and participants. For example, when an invitee accepts or declines the meeting invite, the participate (e.g., the invitee) may provide feedback via the UI 432 with one or more reasons, evidences, or justification for why the invitee is engaging or taking a particular course of action (e.g., declined the event invite because of a schedule conflict, not interested in the event topic, or no longer performing a role associated with the event invite (e.g., promoted to a supervisor).

The cognitive computing system 450 may store the feedback information in the database 475 and may use the feedback data to learn, adjust, or provide increase accuracy sending the event invite or scheduling a meeting assignment. In an additional aspect, after the event is completed, the participant (e.g., invitee) may provide feedback on the value of the meeting as it relates to the participant (e.g., an email indicating the meeting was beneficial for learning a new task). The cognitive computing system 450, using the cognitive component 410 and/or the cognitive component 420, may learn from the feedback data increasing the accuracy of meeting identification, meeting assignment, scheduling, and/or determining the parameters of the meeting and schedule. The cognitive component 410 and/or the cognitive component 420 may also use the feedback from the meeting content to forecast future events.

In an additional embodiment, the cognitive component 410 and/or the cognitive component 420 may update a scheduled Meeting. That is, the cognitive component 410 and/or the cognitive component 420 may learn, re-evaluate, update, and/or reschedule a scheduled meeting and based on current learning, to any of the meeting parameters.

In one aspect, the cognitive computing system 450 may be the computer system/server 12 having processing unit 16 and memory 28 of FIG. 1. Also, the cognitive computing system 450 may be a server (e.g., a meeting server) and may perform contextual analysis of the presentation content and/or agenda topic to identify various prerequisites and/or required prior knowledge as to those participants that may or should attend the meeting. The cognitive computing system 450 may also identify the type of meeting that may be required. For example, a training session event where only a defined number of participants will deliver presentation and the remaining number of participants will listen, participate, and/or ask questions. The type of meeting may also be a multi-party group discussion where every participant may contribute and speak. The type of meeting may also be a status meeting where there will be one or more sub-groups and the sub-groups may share a status to a chair-person of the meeting. The type of meeting may also be group communication, where only a select number of participants will share information to a large group of people.

Thus, the cognitive computing system 450, which may use the cognitive component 410 and/or the cognitive component 420, may identify 1) one or more potential candidates who can deliver presentation and/or agenda contents, and/or 2) one or more potential candidates who attending the event/meeting, while considering both mandatory and optional participants.

Thus, the cognitive computing system 450, which may use the cognitive component 410 and/or the cognitive component 420, may analyze various information to finalize an invitee list (e.g., a chair-person, presenter, attendee, etc.) based on a threshold limit of predicted attendance score.

The analyzed information may include, but not limited to, a) calendar availability of each possible candidates, b) historical information on attending meeting and interaction of each of the participants, c) one or more blogs/social media accounts (e.g., blog post or social network post), d) a knowledge level of one or more potential or predicted candidates (e.g., similar/same content read, attended meeting, showing interest), e) a wish-list/interest level of various candidates on a selected topic, f) one or more personal preferences to attend meeting (e.g., a user does not want a meeting to be started at 8:00 am in the morning), or other defined data.

To further illustrate, consider the following example. Assume a company's customer service email node receives numerous complaints about a certain product or products (e.g., product "X"). Using the clustering operations as defined herein, it may be determined that product X is having quality problems and using the sentiment analysis it is determined that the emails are very negative. A rule may be triggered upon a number of negative emails exceeding a configurable threshold. For example, the rule may indicate that a "quality" meeting must be scheduled to address the quality problems of product X.

The cognitive computing system 450 may have available in its knowledge base a graph of corporate hierarchy with job titles and contact information. The cognitive computing system 450 may also have access to corporate white papers, emails, inspection reports, etc. The triggered rule may specify, for example, a chair person for the meeting and/or the cognitive computing system 450 may traverse the corporate hierarchy and find the most senior quality control person/employee in the quality control department, and/or find and locate the most senior quality control person that has responsibility for product X.

The corpus of emails can be examined to determine attendees. Using a clustering operation, emails related to product X can be partitioned. Using a semantic distance measurement, the cognitive computing system 450 may locate a set of emails by a particular author that are similar to the topic of product X quality. In fact, there may be a number of authors of emails discussing product X quality. The cognitive computing system 450 can take these distance (e.g., the semantic distance) for each author and email and rank each author based on how close the emails are to the topic and the actual number of emails. The cognitive computing system 450 can be provided with multiple rules that help determine, for example, which authors should be invited to the meeting. A level of expertise of an author/employee may be based on the number of emails and/or may be based on how similar to the quality topic the author is in any previous emails. In an additional aspect, a level of expertise may be determined according to a selected scoring operation such as, for example, scoring based on number and close semantic distance. Also, an additional rule may indicate inviting a person/employee if that one person/employee is the only person/employee talking about product X quality he gets invited. Another rule may indicate that if there are at least ten persons/employees talking about product X quality, a configurable threshold is set that only the top 3 authors of related (i.e. the semantic distance is small) emails gets invited. As an additional example, a rule may indicate that only persons/employees with a weighted and normalized score of 90 or above (or other defined percentage or value in a ranking of values) are invited to the meeting. The score may be based on semantic distances of each email the author sent. Also, a rule may indicate that the person/employee with the most related email receives an invite and anyone else having a weighted and normalized score of over 75% may be invited. In short, a set of rules of rules may be defined and selected for selecting those users/persons who demonstrate in a corpus a selected level of knowledge of the quality of product X.

The cognitive computing system 450, which may use the cognitive component 410 and/or the cognitive component 420, may group the participants based on a) a similar knowledge level, prerequisites, and/or prior information of the of the participants, etc., b) availability of resources (e.g., a meeting room and number of participants that may be accommodated, c) availability of additional resources (e.g., flipcharts, markers, pens, sticky notes, projector, video conferencing devices, telephonic conferencing devices, IoT devices, food/beverage services, etc.).

Thus, the cognitive component 420 may send the automatic meeting invites 430 to the predicted participants along with necessary information (e.g., an optional meeting notice 432) about the event/meeting. For example, the additional or necessary information may include a) predicted participant specific customized agenda topic or presentation file, b) location data (e.g., location of the meeting room along with necessary logistic information, and/or c) type of meeting (e.g., video conference, web session, closed room meeting, conference call, etc.).

Figure 5:
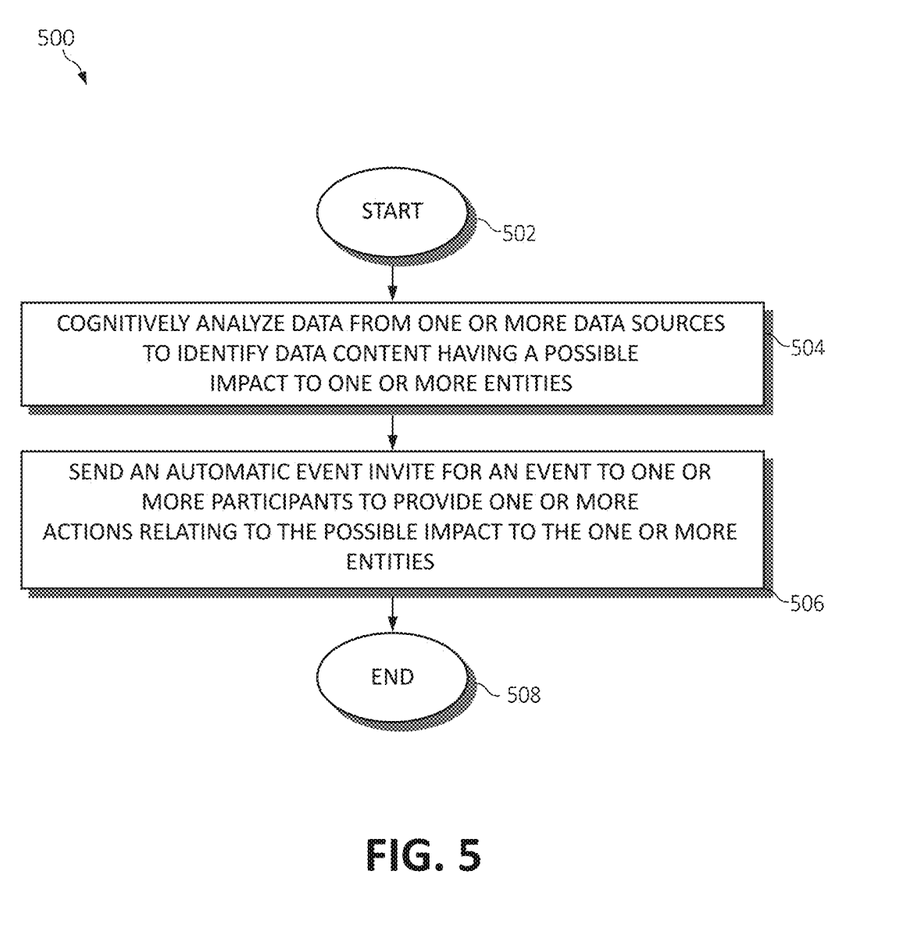
FIG. 5 is a flowchart diagram depicting an exemplary method for intelligent sending of an automatic event invite based on identified candidate content in which various aspects of the present invention may be realized.

Turning now to FIG. 5, a method 500 for intelligent sending of an automatic event invite based on identified candidate content by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium.

The functionality 500 may start in block 502. Data from one or more data sources may be cognitively analyzed to identify data content having a possible impact to one or more entities, as in block 504. An automatic event invite for an event may be sent to one or more participants to provide one or more actions relating to the possible impact to the one or more entities, as in block 506. The functionality may end, as in block 508.

Figure 6:
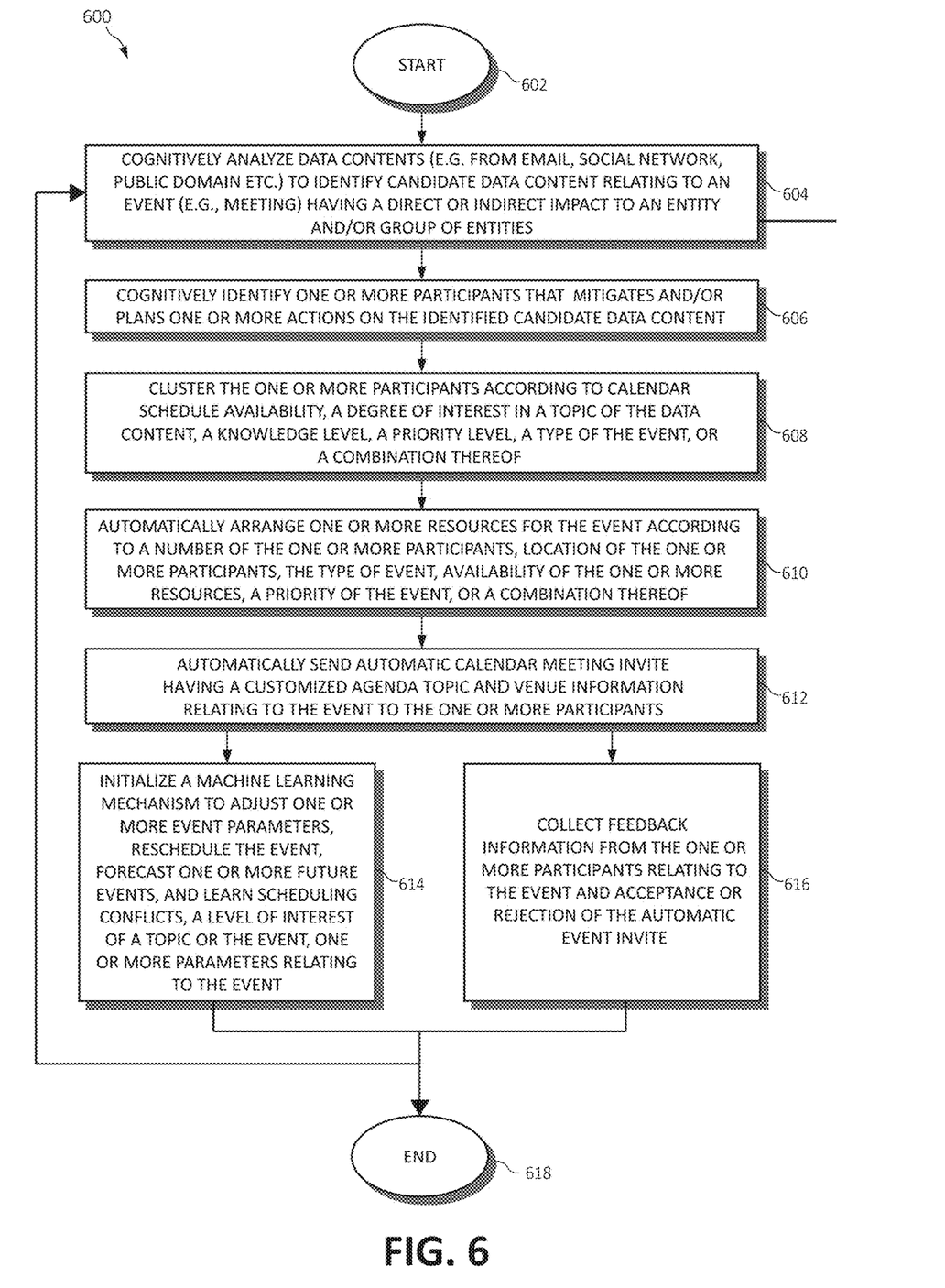
FIG. 6 is a flowchart diagram depicting an additional exemplary method for intelligent sending of an automatic event invite based on identified candidate content, again in which various aspects of the present invention may be realized.

Turning now to FIG. 6, an additional method 600 for intelligent sending of an automatic event invite based on identified candidate content by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium.

The functionality 600 may start in block 602. Data contents (e.g. data from email, social media/networks, public domain, etc.) may be cognitively analyzed to identify candidate data content relating to an event (e.g., meeting) having a direct or indirect impact to an entity and/or group of entities, as in block 604. One or more participants may be cognitively, identified that mitigates and/or plans one or more actions on the identified candidate data content, as in block 606. The one or more participants may be clustered (e.g., clustered into one or more groups) according to calendar schedule availability, a degree of interest in a topic of the data content, a knowledge level, a priority level, a type of the event, or a combination thereof, as in block 608. One or more resources may be automatically arranged (e.g., scheduled, reserved, provided, etc.) for the event according to a number of the one or more participants, location of the one or more participants, the type of event, availability of the one or more resources, a priority of the event, or a combination thereof, as in block 610. A calendar meeting invite having a customized agenda topic AND venue information relating to the event may be automatically sent to the one or more participants, as in block 612.

From block 612, a machine learning mechanism may be initialized to adjust one or more event parameters, reschedule the event, forecast one or more future events, and learn scheduling conflicts, a level of interest of a topic or the event, one or more parameters relating to the event, as in block 614. The functionality from block 614 may move back to block 604 for providing the machine learning information to block 604 and/or end at block 618. Also, from block 612, feedback information may be collected from the one or more participants relating to the event and acceptance or rejection of the automatic event invite, as in block 616. The functionality from block 616 may move back to block 604 for providing the feedback information to block 604 and/or end at block 618. It should be noted that blocks 614 and 616 may be performed in parallel and/or in a sequential operation. In one aspect, the feedback information of block 616 may also be used in block 614 or vice versa. The functionality may end, as in block 614.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for intelligent event scheduling in a computing system by a processor, comprising:
   receiving, by the processor, data from one or more external data sources over a computer network, wherein the data includes data content representative of having a possible impact to one or more meeting participants;
   training, by the processor, a machine learning model using the data from the one or more data sources to identify the data content, wherein training the machine learning model includes training the machine learning model with one or more meeting trigger rules to recognize one or more triggers in the data content that, when detected, provoke performance of an action to schedule a meeting event, and wherein the one or more triggers include explicit triggers of directly describing the action and implicit triggers indirectly describing the action;
   cognitively analyzing, by the processor, the data from the one or more data sources, by initializing a machine learning mechanism implementing the trained machine learning model, to identify the data content having the possible impact to the one or more meeting participants;
   cognitively identifying and predicting, by the processor utilizing the trained machine learning model, one or more meeting participants to mitigate, address, or provide a plan of action to address the possible impact; and
   responsive to identifying the data content that satisfies the one or more triggers by the trained machine learning model, and the predicted meeting participants, sending, by the processor, an automatic meeting event invite for the meeting event to the one or more predicted meeting participants over the computer network providing one or more actions relating to the possible impact to the one or more meeting participants.

2. The method of claim 1, further including clustering the one or more meeting participants according to calendar schedule availability, a degree of interest in a topic of the data content, a knowledge level, a priority level, a type of the event, or a combination thereof.

3. The method of claim 1, further including automatically arranging one or more resources for the meeting event according to a number of the one or more meeting participants, a location of the one or more meeting participants, a type of the meeting event, availability of the one or more resources, a priority of the meeting event, or a combination thereof.

4. The method of claim 1, further including predicting a type of the one or more meeting participants for the meeting event according to an attendance score.

5. The method of claim 1, further including collecting feedback information from the one or more meeting participants relating to the meeting event and acceptance or rejection of the automatic meeting event invite.

6. The method of claim 5, further including initializing the machine learning mechanism using the feedback information to adjust one or more meeting event parameters, reschedule the meeting event, forecast one or more future meeting events, and learn scheduling conflicts, a level of interest of a topic or the meeting event, or the one or more meeting event parameters.

7. A system for intelligent event scheduling, comprising: one or more computers with executable instructions that when executed cause the system to:
receive data, by a processor executing the executable instructions, from one or more external data sources over a computer network, wherein the data includes data content representative of having a possible impact to one or more meeting participants;
train, by the processor, a machine learning model using the data from the one or more data sources to identify the data content, wherein training the machine learning model includes training the machine learning model with one or more meeting trigger rules to recognize one or more triggers in the data content that, when detected, provoke performance of an action to schedule a meeting event, and wherein the one or more triggers include explicit triggers of directly describing the action and implicit triggers indirectly describing the action;
cognitively analyze, by the processor, the data from the one or more data sources, by initializing a machine learning mechanism implementing the trained machine learning model, to identify the data content having the possible impact to the one or more meeting participants;
cognitively identify and predict, by the processor utilizing the trained machine learning model, one or more meeting participants to mitigate, address, or provide a plan of action to address the possible impact; and
responsive to identifying the data content that satisfies the one or more triggers by the trained machine learning model, and the predicted meeting participants, send, by the processor, an automatic meeting event invite for the meeting event to the one or more predicted meeting participants over the computer network providing one or more actions relating to the possible impact to the one or more meeting participants.

8. The system of claim 7, wherein the executable instructions further cluster the one or more meeting participants according to calendar schedule availability, a degree of interest in a topic of the data content, a knowledge level, a priority level, a type of the event, or a combination thereof.

9. The system of claim 7, wherein the executable instructions further automatically arrange one or more resources for the meeting event according to a number of the one or more meeting participants, a location of the one or more meeting participants, a type of the meeting event, availability of the one or more resources, a priority of the meeting event, or a combination thereof.

10. The system of claim 7, wherein the executable instructions further predict a type of the one or more meeting participants for the meeting event according to an attendance score.

11. The system of claim 7, wherein the executable instructions further collect feedback information from the one or more meeting participants relating to the meeting event and acceptance or rejection of the automatic meeting event invite.

12. The system of claim 11, wherein the executable instructions further initializing the machine learning mechanism using the feedback information to adjust one or more meeting event parameters, reschedule the meeting event, forecast one or more future meeting events, and learn scheduling conflicts, a level of interest of a topic or the meeting event, or the one or more meeting event parameters.

* * * * *